US007574451B2

(12) United States Patent
Burges et al.

(10) Patent No.: US 7,574,451 B2
(45) Date of Patent: Aug. 11, 2009

(54) SYSTEM AND METHOD FOR SPEEDING UP DATABASE LOOKUPS FOR MULTIPLE SYNCHRONIZED DATA STREAMS

(75) Inventors: Chris Burges, Bellevue, WA (US); John Platt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 557 days.

(21) Appl. No.: 10/980,684

(22) Filed: Nov. 2, 2004

(65) Prior Publication Data

US 2006/0106867 A1 May 18, 2006

(51) Int. Cl.
*G06F 17/00* (2006.01)
(52) U.S. Cl. .................. 707/104.1; 707/3; 707/100; 700/94; 704/208; 705/51
(58) Field of Classification Search .............. 707/100, 707/104.1
See application file for complete search history.

(56) References Cited

U.S. PATENT DOCUMENTS

| 5,944,815 | A | * | 8/1999 | Witt ........................... 712/207 |
| 5,958,008 | A | * | 9/1999 | Pogrebisky et al. ........... 709/223 |
| 6,952,737 | B1 | * | 10/2005 | Coates et al. ................ 709/229 |
| 6,990,453 | B2 | * | 1/2006 | Wang et al. .................. 704/270 |
| 2002/0023020 | A1 | * | 2/2002 | Kenyon et al. ................ 705/26 |
| 2003/0028796 | A1 | * | 2/2003 | Roberts et al. ............... 713/193 |
| 2003/0055910 | A1 | * | 3/2003 | Amini et al. ................. 709/214 |
| 2003/0086341 | A1 | * | 5/2003 | Wells et al. ............... 369/13.56 |
| 2003/0191812 | A1 | * | 10/2003 | Agarwalla et al. ........... 709/217 |
| 2003/0204517 | A1 |  | 10/2003 | Skinner |
| 2004/0003101 | A1 | * | 1/2004 | Roth et al. .................. 709/231 |
| 2004/0073768 | A1 |  | 4/2004 | Bottemiller |
| 2004/0143349 | A1 | * | 7/2004 | Roberts et al. ............... 700/94 |
| 2004/0260682 | A1 | * | 12/2004 | Herley et al. .................. 707/3 |

OTHER PUBLICATIONS

Accurate modeling of cache replacement policies in a data grid, Otto et al, Proceedings of the 20th IEEE/11th Nasa Goddard Conference on Mass Storage System and Technologies (Mss'03) 2003.*

(Continued)

*Primary Examiner*—Pierre M Vital
*Assistant Examiner*—Augustine Obisesan
(74) *Attorney, Agent, or Firm*—Lyon & Harr, LLP; Mark A. Watson

(57) ABSTRACT

A "Media Identifier" operates on concurrent media streams to provide large numbers of clients with real-time server-side identification of media objects embedded in streaming media, such as radio, television, or Internet broadcasts. Such media objects may include songs, commercials, jingles, station identifiers, etc. Identification of the media objects is provided to clients by comparing client-generated traces computed from media stream samples to a large database of stored, pre-computed traces (i.e., "fingerprints") of known identification. Further, given a finite number of media streams and a much larger number of clients, many of the traces sent to the server are likely to be almost identical. Therefore, a searchable dynamic trace cache is used to limit the database queries necessary to identify particular traces. This trace cache caches only one copy of recent traces along with the database search results, either positive or negative. Cache entries are then removed as they age.

22 Claims, 4 Drawing Sheets

OTHER PUBLICATIONS

Media Streaming on P2P Networks with Bio-inspired cache replacement algorithm, Sasabe et al, LNCS 3141, pp. 380-395, 2004.*

Pre-emptive but safe interval caching for real-time multimedia system, Lee et al, dept. of computer science, Seoul National University, computer system science and engineering, vol. 18 No. 2 Mar. 2003.*

Goldstein, J.; Platt, John C.; Burges, C. J.C.; "Indexing High-Dimensional Rectangles for Fast Multimedia Identification," Microsoft Technical Report, MSR-TR-2003-38, Oct. 28, 2003.

Mahedero, G.; Tarasov, J. ; Batlle, V. ; Guaus, E. ; Masip, J.; "Industrial audio fingerprinting distributed system with Corba and Web Services." Proceedings of Fifth International Conference on Music Information Retrieval; Barcelona, Oct. 14, 2004.

Burges, C. J., Platt, J. C., and Goldstein, J. "Identifying audio clips with Rare," In Proceedings of the Eleventh ACM international Conference on Multimedia, Berkeley, CA, USA, Nov. 2, 2003, Multimedia '03. ACM Press, New York, NY, 444-445.

Burges, C.J.C., Platt, J.C., Jana, S., "Distortion discriminant analysis for audio fingerprinting," IEEE Transactions on Speech and Audio Processing, May 2003, vol. 11, Issue: 3, pp. 165-174.

Batlle, E. Masip, J. Cano, "System analysis and performance tuning for broadcast audio fingerprinting," Proceedings of 6th International Conference on Digital Audio Effects; London, UK, Sep. 8, 2003.

\* cited by examiner

SYSTEM AND METHOD FOR SPEEDING UP DATABASE LOOKUPS FOR MULTIPLE SYNCHRONIZED DATA STREAMS

BACKGROUND

1. Technical Field

The invention is related to identification of media objects in broadcast media streams, and in particular, to a system and method for providing concurrent server-side identification of media objects, such as songs, in synchronized data streams to large numbers of individual clients while minimizing server database query loading.

2. Related Art

There are many existing schemes for extracting "features" from signals to be used for identification purposes. For example, with respect to a one-dimensional signal such as an audio signal or audio file, audio feature extraction has been used as a necessary step for classification, retrieval, and identification tasks involving media objects in the audio signal. For identification purposes, the extracted features or "traces" are typically compared to a known "fingerprint" for identifying either elements within the audio signal or the entire audio signal. Such well known media object identification schemes are conventionally known as "audio fingerprinting."

A number of conventional schemes have adapted such audio fingerprinting techniques to provide identification of particular songs in an audio stream, such as a radio or Internet broadcast. For example, a user listening to an audio stream may hear some song for which he or she would like to know the title, artist, album, etc. Conventional audio fingerprinting techniques are then used to extract one or more traces from samples of the song. Typically, these traces are then compared to fingerprints in a database of known music to identify a match, with the results then being provided to the user.

Further, such techniques have also been adapted to a number of conventional services to provide a fee-based song identification or lookup service that is generally based on audio fingerprinting techniques and database comparisons. For example, several song identification services, such as the relatively well known "Shazam" music identification service, operate to identify specific songs for users via a cell phone network. In particular, systems such as that offered by Shazam generally operate by first requiring the user to dial a number on his cell phone and then to hold the phone up to the music for around 15 to 30 seconds. The Shazam service then identifies the music by comparing the music (or traces computed from the music) to a database of known music. The Shazam service then returns a text message to the user with the title, artist, album, etc. of the identified song.

Unfortunately one problem with lookup services of the type described above is that as the number of users accessing the music identification system at any given time increases, the number of database lookup requests per second also increases. This problem is mitigated, for example, in services such as that provided by Shazam, since the user must pay for the telephone call and for the service itself, for each song he wishes to identify, since the effect of charging users in this fashion tends to limit the number of concurrent users of the system, thereby reducing overall server load. Another problem with such a system is that it requires that samples of the full song (limited by the frequency/bandwidth constraints of the telephone service) be transmitted to the server which is then required to compute traces from the transmitted sample of the media stream.

Consequently, as the number of concurrent users becomes increasingly large, the corresponding computational load for computing traces or fingerprints from the incoming music, performing database lookups for identifying those fingerprints and responding to the individual users can quickly overwhelm even relatively large banks of dedicated servers. As a result, such schemes tend to be limited by the assumption that the number of concurrent users will be relatively low. Further, while it is possible to scale up such schemes to provide a sufficient number of servers to handle large numbers of concurrent users, potentially in the tens of millions, the dollar cost for such a system would likely be prohibitive.

Therefore, what is needed is a system and method for providing real-time identification of songs. Further, such a system and method should be capable of efficiently providing song identification services to large numbers of concurrent users while simultaneously minimizing server load and database lookups. Finally, such a system and method should further minimize server load by eliminating the burden of computing traces from samples of the media stream by requiring that task to be performed by each of a plurality of client computers.

SUMMARY

A "Media Identifier," as described herein, operates to solve the problems identified above by providing to individual clients a real-time server-side identification of media objects embedded in a streaming media broadcast, such as, for example, a radio, television, or Internet broadcast. These media objects include, for example, songs, commercials, jingles, station identifiers, etc. In general, the Media Identifier operates by providing at least one server which provides real-time identification of media objects in the broadcast media stream to individual clients by comparing "traces" computed by each client from sampled portions of the media stream to a database of known fingerprints. In general, the computed traces are sent by each client to the server and compared, either directly, or via a server-side trace cache, against a large database of stored, pre-computed traces (referred to herein as "fingerprints" to differentiate them from the client generated traces)) of known identification.

In particular, for each client, fixed-length segments of the incoming media stream are used to compute low-dimensional "traces" at repeated intervals. In a tested embodiment, such traces were computed and sent by each client on the order of about six times a second from samples of the media stream on the order of about six seconds. Clearly, more or fewer traces, using longer or shorter sample periods can be used, with these parameters typically being dependent upon the particular techniques being used for trace computation.

Computation of the traces from the media stream is accomplished using conventional techniques, such as, for example, the system described in U.S. patent application publication No. US 2003/0236661, entitled "SYSTEM AND METHOD FOR NOISE-ROBUST FEATURE EXTRACTION," the subject matter of which is incorporated herein by this reference. In general, such systems operate by sampling the incoming media stream and computing low dimensional feature vectors (i.e., "traces") from the sampled signal. Trace computation from sampled media streams is known to those skilled in the art, and will not be described in detail herein.

The fingerprints comprising the fingerprint database are generally computed in the same manner as the traces, using the same algorithms. However, unlike the traces, the fingerprints are only computed once, from one or more samples of each known media object so as to build the database of known fingerprints. Once created, this database is then simply accessed by the server, with no need to re-compute the fingerprints for known media objects. However, the database of known fingerprints can then be updated with new fingerprints as new media objects (songs, etc.) are created. Therefore, the database of known fingerprints is preferably created offline and then simply provided to the server so as to eliminate any additional computational load on the server during the media identification operations performed by the Media Identifier described herein For each client, the server then uses inexact matching to determine whether any of the traces match any of the fingerprints in the database within some threshold or tolerance. The use of such inexact matching techniques is preferable over exact matching techniques, since the traces computed by any of the clients can vary due to noise, interference, signal attenuation, etc., even where the traces are computed from the exact same portions of the media stream. Further, the use of inexact matching also accounts for small temporal offsets of the sampled portions of the media stream from which the traces were computed. In one embodiment, the inexact matching uses fingerprint-specific renormalization, to improve accuracy, as is known in the art, such as described in the publication entitled "Distortion Discriminant Analysis for Audio Fingerprinting," by Christopher J. C. Burges, John C. Platt, and Soumya Jana, IEEE transactions on Speech and Audio Processing, IEEE Transactions on Speech and Audio Processing, Vol. 11, No. 3, pp 165-174, May 2003, the subject matter of which is incorporated herein by this reference.

Whenever a trace from one client matches a fingerprint, the server informs that client of the identity of the particular media object corresponding to that trace. In the case of media objects such as songs, this identity typically includes information such as, for example, the artist, song title, album name, genre, etc. Clearly, given a known media object, any desired information can be associated with fingerprints in the database that are used to identify that media object.

However, rather than providing a brute force search of the fingerprint database for every trace sent to the server, the Media Identifier described herein introduces an extra server-side cache which leverages the fact that at any time, many of the user-generated traces are likely to be almost identical, assuming that there are a finite number of media streams, and that there are typically a large number of users that are receiving the same media stream at any given time. In other words, at any given point in time, it is likely that there are many, potentially tens of thousands or even millions, of people that are listening to the same media stream, such as particular radio, television, or Internet broadcasts. This observation allows for the creation of the server-side cache which caches both the incoming traces and the results of the database search for matching fingerprints.

In particular, each incoming trace from each client is first checked against the cache, which contains some number of traces. If the trace is not in the cache, then a full database lookup is done, and the results of that database lookup, either positive or negative, are stored in the cache along with the trace sent by the client. The lookups in both the cache and the database can be accomplished using conventional techniques, such as, for example, a linear scan (i.e. sequentially) with bailing (a known method for speeding up distance comparisons using linear scan).

In another embodiment, the lookups in the database are accelerated by use of bit vector indexing, as described in a copending U.S. patent application entitled "Multidimensional Data Object Searching Using Bit Vector Indices," having a filing date of Jun. 23, 2003, and assigned Ser. No. 10/602,438, the subject matter of which is incorporated herein by this reference. This bit vector indexing approach is also described in a publication entitled "Indexing High Dimensional Rectangles for Fast Multimedia Identification," by Jonathan Goldstein, John C. Platt, and Christopher J. C. Burges, Microsoft Technical Report MSR-TR-2003-38, dated Oct. 28, 2003, the subject matter of which is incorporated herein by this reference.

In general, the bit vector indexing methods described in the aforementioned U.S. Patent Application and the corresponding Microsoft Technical Report addresses the problem of quickly performing point queries against high-dimensional regions. Such queries are useful in the increasingly important problems of multimedia identification and retrieval, where different database entries have different metrics for similarity. In contrast to typical database indexing which focuses on indexing for high-dimensional nearest neighbor and epsilon range queries, indexing for point queries against high-dimensional regions provides an efficient indexing method which relies on the combination of redundancy and bit vector indexing to achieve significant performance gains. Such methods have been observed to provide a significant performance increase over real-world linear scans.

Negative results of the database search, i.e., no match of the trace against the fingerprints in the database, are not sent back to the client. Positive results of the database search, i.e., a match between the trace and a fingerprint, are sent back to the client so as to identify the media object from which the trace was computed. As noted above, the cache is searched to identify matching traces prior to searching the fingerprint database. Consequently, if a match is found against the traces stored in the cache, no further database lookup is needed, as the trace in the cache will either include the identity of the associated media object, or will simply indicate that there is no matching fingerprint. In the case that a trace matches a fingerprint in the database, any identity information associated with that matching fingerprint will be sent back to the client.

One advantage of the server-side cache provided by the Media Identifier is that the size of the cache is relatively small, making cache searches extremely rapid. In particular, the cache size is a function of the maximum expected delay between clients of receiving a point in the media stream, and the number of unique media streams for which identification services are being provided. Further, it should be noted that the cache size is not a function of the number of users.

In particular, each particular media broadcast stream is approximately synchronized for each client that is receiving that particular media stream. For example, any two or more clients receiving the same radio station are likely receiving the same signal within a very short temporal offset, on the order of about one second or so. The same is also true for most Internet or network broadcasts of streaming media.

Therefore, there is no need to keep traces in the media cache for longer than some small multiple of the maximum expected delay time (with the delay time also including the maximum expected delay for each client to compute and transmit the trace to the server). In other words, this delay is simply the maximum time between the server receiving the first trace for a given section of a particular media object, and the server receiving the last trace (from the slowest client) for the section of the same media object. Consequently, traces need only be kept for a short period, on the order of several seconds. As a result, there is no need for a large cache to store all of the unique incoming traces.

In a related embodiment, rather than trying to determine or estimate maximum delay times for setting trace lifetimes in the cache, a more simple solution is to simply remove traces from the cache after they fail to match any incoming traces for some short period of time, on the order of about one second or so. In further alternate embodiments, other caching schemes can also be used, including, for example, the use of a fixed cache size that drops traces based on conventional LRU (least recently used) logic.

In view of the above summary, it should be clear that the Media Identifier described herein provides a unique system and method for providing real-time media identification for large numbers of concurrent client requests for synchronous media broadcast streams. In addition to the just described benefits, other advantages of the Media Identifier will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
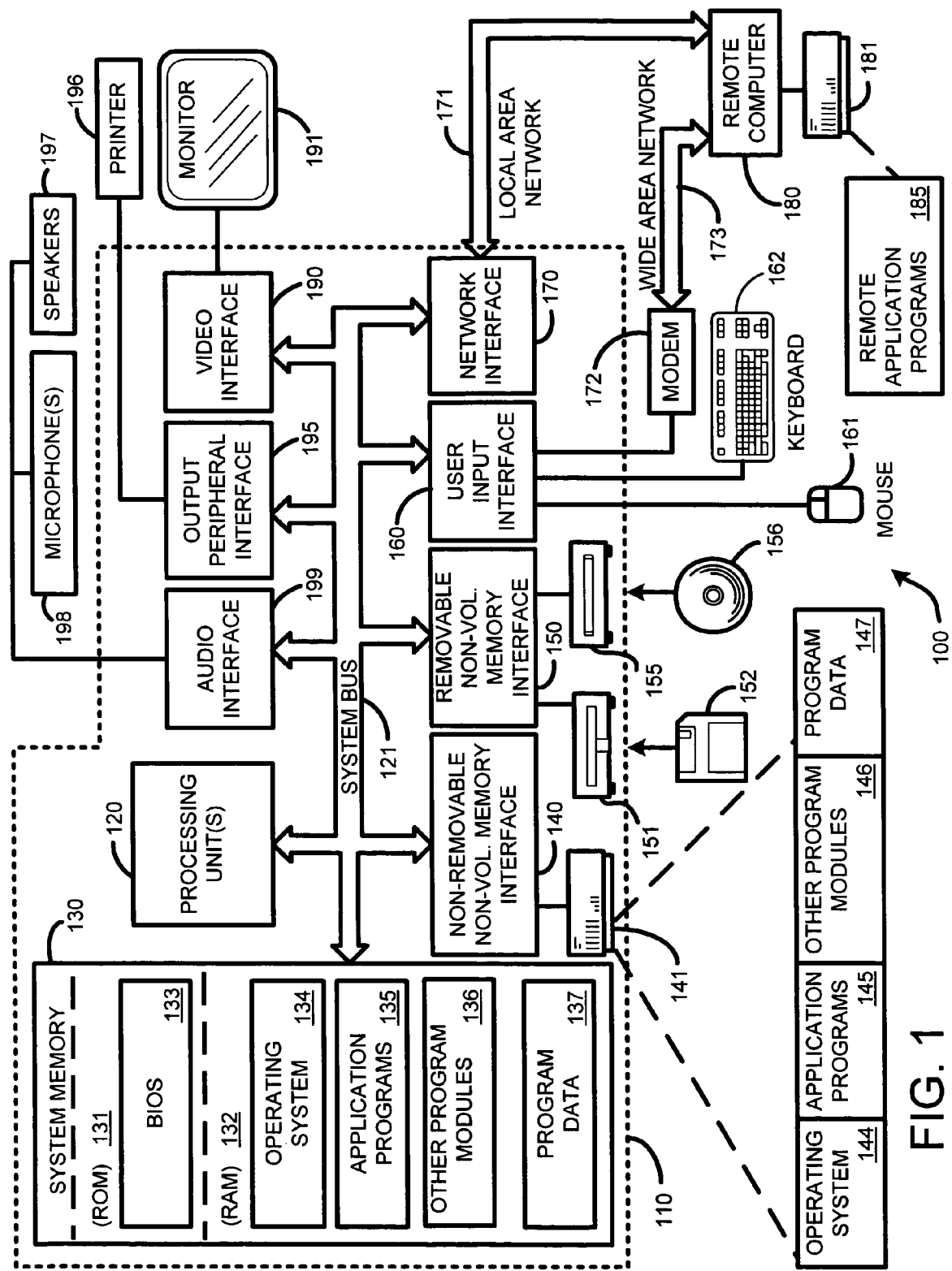
FIG. 1 is a general system diagram depicting a general-purpose computing device constituting an exemplary system implementing a "Media Identifier," as described herein.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with hardware modules, including components of a microphone array 198. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor, computers may also include other peripheral output devices such as a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying a "Media Identifier" which provides clients with real-time server-side identification of media objects embedded in a streaming media broadcast.

2.0 Introduction:

A "Media Identifier," as described herein, provides individual clients with real-time identification of media objects embedded in a monitored media stream such as a radio, television, or Internet broadcast. Such media objects may include songs, commercials, jingles, station identifiers, etc.

In general, identification of the media objects is provided to individual clients by comparing client-generated "traces" to a large database of stored, pre-computed traces (referred to herein as "fingerprints" to differentiate them from the client generated traces) of known identification. These client-generated traces are computed by each client from samples of the media stream on an ongoing basis and transmitted to the server for identification.

Further, given a finite number of media streams and a much larger number of clients, many of the traces sent to the server are likely to be almost identical, since many of the clients will be concurrently monitoring the same media stream. This observation is used in the creation of a searchable dynamic trace cache for limiting the number of database queries necessary to identify particular traces, and thus the media objects associates with those traces. One advantage of searching the trace cache rather than the database is that a workable database of fingerprints will typically include millions of entries, while the trace cache will typically be smaller by orders of magnitude.

The trace cache caches only one copy of recent traces sent by the various clients, along with the database search results, either positive or negative. In other words, any trace that is sent by one of the clients that does not currently exist in the cache will be stored in the cache, at least temporarily, as explained in further detail below. Therefore, the trace cache is searched prior to making a database query. The database is then only queried to identify a new client-generated trace when there is no matching trace in the trace cache. Further, traces stored in the trace cache are removed as a function of time. In one embodiment, this is simply a preset "lifetime," while in a related embodiment this time to live is based on the period since a last matching trace was sent to the server by some client. In other words, cache entries are simply removed from the cache as they age without having hits of matching traces.

Figure 2:
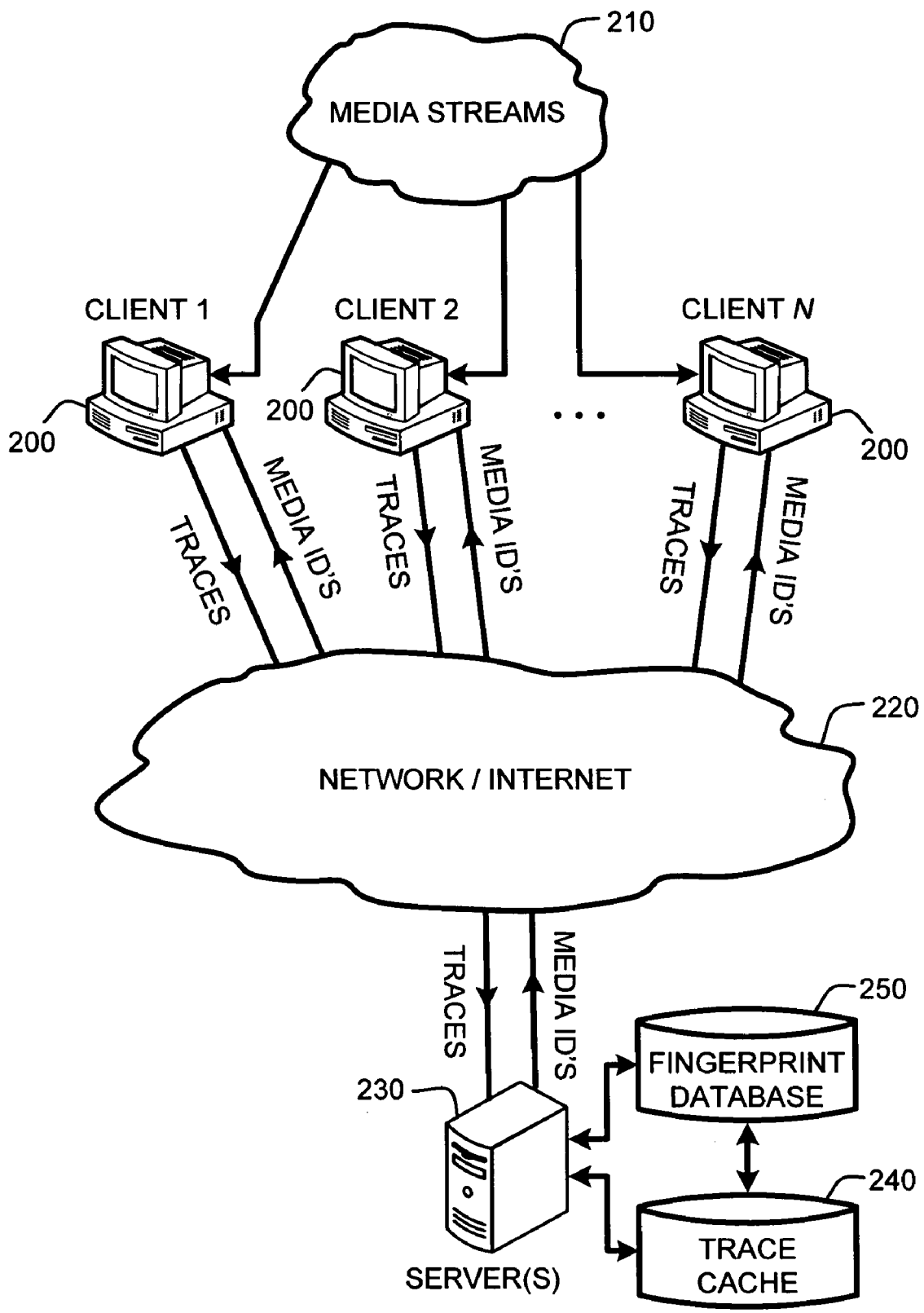
FIG. 2 provides an exemplary architectural system diagram which illustrates a general relationship between functional components for implementing the Media Identifier, as described herein.

These general concepts are illustrated by the exemplary architectural system diagram of FIG. 2, which illustrates a general functional relationship between components for implementing the Media Identifier. In particular, FIG. 2 shows that each of a plurality of clients 200 receives a media broadcast stream 210. As discussed in further detail herein, the universe of available media streams 210, such as radio station broadcasts, television or cable broadcasts, network-based streaming media, etc., is substantially smaller than the number of potential clients 200. Consequently, most of the media streams 210 will be simultaneously monitored by more than one client 200, and potentially by hundreds, thousands, or even millions of clients. However, it should be noted that not all of the media streams 210 will be available to all of the clients 200, as the media streams include locally available broadcasts, and the clients can be located anywhere in the world while communicating with the server 230 via the Internet 220 or other network.

The clients 200 then sample the monitored media stream 210 and send computed traces via a network or the Internet 220 to a server 230 (or bank of servers). The server 230 then checks a trace cache 240, and, if necessary, a fingerprint database 250, in an attempt to identify the media objects from which the traces were generated. If identified, media identification information corresponding to particular traces is returned to the sending client 200 by the server 230 via the network 220.

2.1 System Overview:

As noted above, the Media Identifier described herein provides clients with real-time server-side identification of media objects embedded in a streaming media broadcast, such as, for example, a radio, television, or Internet broadcast. In general, the Media Identifier operates by providing at least one server which provides real-time identification of media objects in the broadcast media stream to individual clients by comparing "traces" computed by each client from sampled portions of the media stream to a database of known fingerprints. In general, the computed traces are sent by each client to the server and compared, either directly, or via a server-side trace cache, against a large database of stored, pre-computed fingerprints of known identification.

For each client, the server then uses inexact matching to determine whether any of the traces match any of the fingerprints in the database within some threshold or tolerance. The use of such inexact matching techniques is preferable over exact matching techniques, since the traces computed by any of the different clients can vary somewhat due to noise, interference, signal attenuation, etc., even where the traces are nominally computed from the same portions of the media stream. Further, the use of inexact matching also accounts for small temporal offsets of the sampled portions of the media stream from which the traces were computed.

Whenever a trace from one client matches a fingerprint (either in the trace cache or in the fingerprint database), the server informs that client of the identity of the particular media object corresponding to that trace. In the case of media objects such as songs, this identity typically includes information such as, for example, the artist, song title, album name, genre, etc. Clearly, given a known media object, any desired information can be associated with fingerprints in the database that are used to identify that media object.

However, rather than providing a brute force search of the fingerprint database for every trace sent to the server, the Media Identifier described herein instead introduces an extra server-side trace cache which leverages the fact that at any time, many of the user-generated traces are likely to be almost identical, assuming that there are a finite number of media streams, and that there are typically a large number of users that are receiving the same media stream at any given time. In other words, at any given point in time, it is likely that there are many, potentially tens of thousands or even millions, of people that are listening to the same media stream, such as particular radio, television, or Internet broadcasts. This observation allows for the creation of the server-side trace cache which caches both the incoming traces and the results of the database search for matching fingerprints.

In particular, each incoming trace from each client is first checked against the trace cache, which contains some number of traces. If the trace is not in the trace cache, it is stored there, and a full database lookup is done. The results of that database lookup, either positive or negative, are then stored in the trace cache along with the trace sent by the client. The lookups in both the trace cache and the database can be accomplished using conventional techniques, such as, for example, a linear scan (i.e. sequentially) with bailing (a known method for speeding up distance comparisons using linear scan).

In another embodiment, the lookups in the database are accelerated by use of bit vector indexing, as described in a copending U.S. patent application entitled "Multidimensional Data Object Searching Using Bit Vector Indices," having a filing date of Jun. 23, 2003, and assigned Ser. No. 10/602,438, the subject matter of which is incorporated herein by this reference. This bit vector indexing approach is also described in a publication entitled "Indexing High Dimensional Rectangles for Fast Multimedia Identification," by Jonathan Goldstein, John C. Platt, and Christopher J. C. Burges, Microsoft Technical Report MSR-TR-2003-38, dated Oct. 28, 2003, the subject matter of which is incorporated herein by this reference.

In general, the bit vector indexing methods described in the aforementioned U.S. Patent Application and the corresponding Microsoft Technical Report addresses the problem of quickly performing point queries against high-dimensional regions. Such queries are useful in the increasingly important problems of multimedia identification and retrieval, where different database entries have different metrics for similarity. In contrast to typical database indexing which focuses on indexing for high-dimensional nearest neighbor and epsilon range queries, indexing for point queries against high-dimensional regions provides an efficient indexing method which relies on the combination of redundancy and bit vector indexing to achieve significant performance gains. Such methods have been observed to provide a significant performance increase over real-world linear scans.

With each of the aforementioned database search embodiments, negative results of the database search, i.e., no match of the trace against the fingerprints in the database, are not sent back to the client. Positive results of the database search, i.e., a match between the trace and a fingerprint, are sent back to the client so as to identify the media object from which the trace was computed. As noted above, the cache is searched to identify matching traces prior to searching the fingerprint database. Consequently, if a match is found against the traces stored in the cache, no further database lookup is needed, as the trace in the cache will either include the identity of the associated media object, or will simply indicate that there is no matching fingerprint. In the case that a trace matches a trace in the database, any identity information associated with that matching trace will be sent back to the client.

Figure 3:
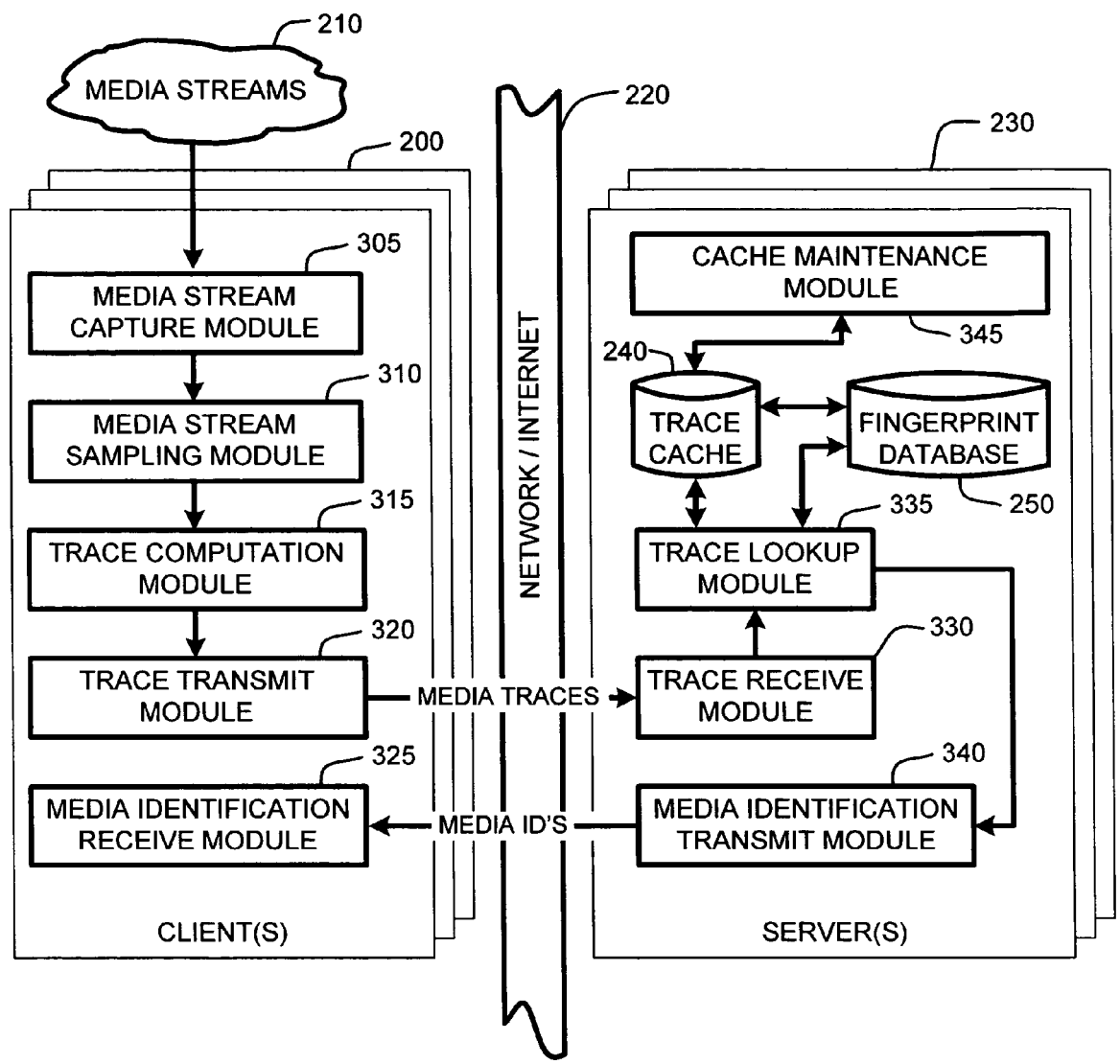
FIG. 3 provides an exemplary architectural flow diagram which illustrates program modules for implementing the Media Identifier, as described herein.

2.2 System Architectural Overview:

The processes summarized above are illustrated by the general system diagram of FIG. 3. In particular, the system diagram of FIG. 3 illustrates the interrelationships between program modules for implementing a Media Identifier, as described herein.

In general, the Media Identifier begins operation with respect to each client 200 by having each client receive one of the media streams 210 by using a media stream capture module 305 to receive the media stream. Note that media streams 210 can be audio streams, video streams, or a mixture of both. The clients 200 then sample the incoming media streams in real-time using a media stream sampling module 310. A trace computation module 315 is then used by each client to continuously generate traces from the sampled media stream. Note that the number and frequency of traces generated by each client is described in further detail below in Section 3. The generated traces are then provided to a trace transmit module 320 which transmits the traces to the server 230 via the network or Internet 220.

The server 230 then uses a trace receive module 330 for receiving the transmitted traces from the various clients 200. As soon as the server 230 begins to receive the traces from the various clients 200, they are provided to a trace lookup module 335 which first searches the trace cache 240 to find matching traces. If there is a matching trace, then the corresponding media identification information in the trace cache 240 is transmitted by a media identification transmit module 340 back to a media identification receive module 325 on the client 200. If there is no matching trace in the trace cache, the trace is stored in the trace cache 240 and a search of the fingerprint database 250 is performed by the trace lookup module 335. Alternately, if there is no matching trace in the trace cache 240, the trace lookup module 335 Queries the fingerprint database 250 to determine whether the transmitted trace is associated with a positive hit in the fingerprint database. Again, if there is a matching trace, then the corresponding media identification information in the trace cache 240 is transmitted by the media identification transmit module 340 back to the media identification receive module 325 on the client 200.

Finally, a cache maintenance module 345 provides for general cache cleanup operations. In particular, as noted above, all traces received by the server 230 that can not be found in the trace cache 240 are added to the cache along with the results of a corresponding database search (either positive or negative). However, without some limitations on this process, the trace cache 240 would quickly overflow. Therefore, as described in further detail in Section 3, the trace cache is cleaned of older traces as a function of time. Specifically, in one embodiment, the cache maintenance module 345 deletes any traces older than some predetermined period from the cache. Alternately, the cache maintenance module 345 deletes any traces that have not been matched with incoming traces by the trace lookup module 335 for some predetermined period of time. In yet further embodiments, the cache maintenance module 345 uses either a combination of these trace lifetimes, or different trace lifetimes for traces with positive database 250 hits and negative database hits.

3.0 Operation Overview:

The above-described program modules are employed for implementing the Media Identifier. As summarized above, the Media Identifier provides individual clients with real-time identification of media objects embedded in a monitored media stream such as a radio or Internet broadcast. The following sections provide a detailed discussion of the operation of the Media Identifier, and of exemplary methods for implementing the program modules described in Section 2 with respect to FIG. 2 and FIG. 3. In addition, following the detailed description of the Media Identifier operation provided below in Section 3.1, an operational flow diagram is presented with respect to FIG. 4 which summarizes the overall operation of the Media Identifier in view of that detailed description.

3.1 Operational Details of the Media Identifier:

The following paragraphs detail specific operational and alternate embodiments of the Media Identifier described herein. In particular, the following paragraphs describe the computation of traces and the construction of the fingerprint database; the lifetimes of traces in the trace cache; searching of the trace cache; database searching; the use of local client database lookups using downloaded subsets of the fingerprint database; and finally, providing media object identification to the client.

3.1.1 Trace Computation and Fingerprint Database Construction:

Computation of traces or "fingerprints" from an audio signal or from samples of an audio stream for use in media identification is a concept that is well understood to those skilled in the art. In general, such systems often operate by sampling the incoming media stream and computing compact feature vectors (i.e., "traces") from the sampled signal. These compact feature vectors can comprise low-dimensional vectors or they can comprise binary hash keys. Since trace computation from sampled media streams is known to those skilled in the art, the subject will not be described in detail herein.

With respect to the Media Identifier, computation of the traces from the media stream is accomplished using any of a number of conventional techniques. For example, one trace computation technique used in a tested embodiment of the Media Identifier is described in U.S. Patent Application Publication, No. US 2003/0236661, entitled "SYSTEM AND METHOD FOR NOISE-ROBUST FEATURE EXTRACTION," the subject matter of which is incorporated herein by this reference.

The system described by the aforementioned U.S. Patent Application Publication, No. US 2003/0236661, generally operates by computing or extracting features from audio signals using a "feature extractor" which is trained on a mix of artificial and/or real-world signals using a "Distortion Discriminant Analysis" (DDA) to define parameters of the feature extractor. The described feature extractor takes signals having one or more dimensions with a temporal or spatial structure, applies an oriented principal component analysis (OPCA) to limited regions of the signal, aggregates the output of multiple OPCAs that are spatially or temporally adjacent, and applies OPCA to the aggregate. The steps of aggregating adjacent OPCA outputs and applying OPCA to the aggregated values are performed one or more times for extracting low-dimensional noise-robust features from signals, including audio signals, images, video data, or any other time or frequency domain signal. Once trained, the feature extractor is then simply used to generate the traces (and fingerprints) used by the Media Identifier described herein.

However, as noted above, the "feature extractor" identified above is clearly not the only method for computing traces or fingerprints. Regardless of how the traces or fingerprints are computed, the basic idea is to compute compact "traces" of fixed-length segments of the incoming media stream for each client. In a tested embodiment, such traces were computed and sent by each client on the order of about six times a second from samples of the media stream on the order of about six seconds. Clearly, more or fewer traces, using longer or shorter sample periods can be used, with these parameters typically being dependent upon the particular techniques being used for trace computation.

The fingerprints comprising the fingerprint database are generally computed in the same manner as the traces, using the same algorithms so that there is a clear correspondence between the traces computed by each client and the fingerprints used to populate the fingerprint database. However, unlike the traces which are computed continuously as the media stream progresses, the fingerprints are only computed once, from one or more samples taken from particular locations within known media objects so as to populate the database fingerprints corresponding to those known media objects. The number of fingerprints computed for each media object can be as few or as many as desired. However, in a tested embodiment, it was observed that providing several fingerprints per media object was sufficient to provide robust media object identification.

Once created, the fingerprint database is then simply accessed by the server, as described herein, with no need to re-compute the fingerprints for known media objects. However, the database of known fingerprints can then be updated with new fingerprints as new media objects (songs, etc.) are created. Therefore, the database of known fingerprints is preferably created offline using whatever trace computation algorithms are to be used by the clients for computing the traces, and then simply provided to the server so as to eliminate any additional computational load on the server during the media identification operations performed by the Media Identifier described herein 3.1.2 Trace Cache Lifetimes:

One advantage of the server-side trace cache provided by the Media Identifier is that the size of the cache is relatively small, making cache searches extremely rapid. In particular, the cache size is a function of the maximum expected delay between requests from each client, and the number of unique media streams for which identification services are being provided. Further, it should be noted that the cache size is not a function of the number of individual clients or users that access the server with trace identification requests.

Specifically, each particular media broadcast stream is approximately synchronized for each client that is receiving that particular media stream. For example, any two or more clients receiving the same radio station are likely receiving the same signal within a very short maximum temporal offset, on the order of about one second or so, depending upon the type and source of media stream being received. The same is also true for most Internet or network broadcasts of streaming media.

Therefore, there is no need to keep traces in the media cache for longer than some small multiple of the maximum expected inter-client delay time (with the delay time also including the maximum expected delay for each client to compute and transmit the trace to the server). In other words, this delay is simply the maximum time between the server receiving the first trace for a given section of a particular media object, and the server receiving the last trace (from the slowest client) for the section of the same media object. Consequently, traces need only be kept for a short period, on the order of several seconds. As a result, there is no need for a large cache to store all of the unique incoming traces.

In a related embodiment, rather than trying to determine or estimate maximum delay times for setting trace lifetimes in the cache, a more simple solution is to simply remove traces from the cache after they fail to match any incoming traces for some short period of time, on the order of about one second or so. In further alternate embodiments, other caching schemes can also be used, including, for example, the use of a fixed cache size that drops traces based on conventional LRU (least recently used) logic.

3.1.2 Trace Cache Searching:

As noted above, as soon as the server receives any traces, the trace cache is immediately searched to determine whether there is a matching trace in the trace cache. Then, if there is a match, a determination is made as to whether that matching trace has any associated media object identification information, or whether it is a trace that was not found in the database. Again, traces not found in the trace cache are added to the trace cache, and the database is then immediately searched to determine whether that trace exists in the database.

The determination of whether incoming traces match any traces in the trace cache is made using conventional signal comparison techniques. Such techniques include, for example, conventional cross correlations, and linear scans which directly compare the points of the incoming trace to each of the traces in the trace cache. In either case, matching is preferably inexact, as noted above, since the traces computed by any of the different clients can vary somewhat due to noise, interference, signal attenuation, etc., even where the traces are nominally computed from the same portions of the media stream. Exact matching can be used, but it has proven to be less effective in correctly identifying matching traces. In one embodiment, the inexact matching uses fingerprint-specific renormalization, to improve accuracy, as is known in the art, such as described in the publication entitled "Distortion Discriminant Analysis for Audio Fingerprinting," by Christopher J. C. Burges, John C. Platt, and Soumya Jana, IEEE transactions on Speech and Audio Processing, IEEE Transactions on Speech and Audio Processing, Vol. 11, No. 3, pp 165-174, May 2003, the subject matter of which is incorporated herein by this reference.

In the case of inexact matching, the match is determined with respect to some distance metric f and a corresponding threshold θ. For example, if traces are low-dimensional vectors, to directly compare incoming trace X to a set of cached traces Y, one simple way to make the comparison between the traces is to simply evaluate the squared Euclidean distance in Equation 1, once for each trace indexed by j:

$$\sum_{i=1}^{n}(x_i - y_{ij})^2 < \theta_j \qquad \text{Equation 1}$$

where $x_i$ is the $i^{th}$ element of the trace, $y_{ij}$ is the $i^{th}$ element of the $j^{th}$ cached trace, n is the number of components of a trace vector, and $\theta_j$ is a distance threshold associated with the $j^{th}$ cached trace.

It should be noted that the comparison method described above is only one of a very large number of conventional techniques for comparing signals or traces. Such methods are well known to those skilled in the art, and will not be described herein. However, it should be understood that any conventional technique for comparing two signals or traces is applicable for use with the Media Identifier described herein, and that the Media identifier is not intended to be limited to the use of the simple linear scan described above. Further, there are also a number of conventional techniques for accelerating the searches for matching signals or traces. On simple method is to simply search the cache in order of frequency of occurrence of prior matches. Clearly there are other conventional search acceleration schemes, any of which are applicable for use with the Media Identifier described herein.

3.1.4 Databases Searches:

As noted above, database searches are only performed in the event that a particular incoming trace fails to match any of the traces in the trace cache. Actual search of the fingerprint database is accomplished in much the same way as the search for matches in trace cache. In fact, the same types of trace comparisons described above with respect to trace cache searches are used to compare the incoming traces to the fingerprints in the fingerprint database. However, it should be noted that the fingerprint database is expected to be substantially larger than the trace cache. In fact, a media object database containing only song fingerprints could be expected to easily have millions of entries if is to fully represent the available spectrum of music being streamed or broadcast across the world. Consequently, methods for accelerating the database search tend to be substantially more important than the acceleration of the trace cache search.

In this respect, searching in order of popularity or frequency of occurrence tends to provide a significant increase in performance, as it is substantially more likely that a very popular song will be streamed on one or more media streams than some archaic song by an unknown artist. Measuring the frequency of occurrence is an easily accomplished tasked. In particular, one simple method is to simply count the number of times that a particular media object is identified in different streams and at different times through some period (by counting the trace cache hits and database matches). For search purposes, the entries in the fingerprint database can then be ordered in order of frequency of occurrence. Further, as noted above, there are a number of conventional techniques for accelerating database searches for matching signals or traces, any of which are applicable for use with the Media Identifier described herein.

3.1.5 Local Database Lookups:

In one embodiment, server load is further reduced by automatically uploading some small part or subset of the overall fingerprint database (and possible some part of the trace cache as well) to one or more of the local clients. Typically, the traces and/or fingerprints that are uploaded to the individual clients should be those that are most frequently observed (i.e., those traces/fingerprints corresponding to the most popular media objects.)

In this embodiment, rather that immediately sending every computed trace to the server, each client having a subset of the fingerprint database and/or the trace cache (i.e., a "local trace subset") will first query the local trace subset prior to sending any computed trace to the server for identification purposes. If any computed trace matches any of the traces in the local trace subset, they any identification information associated with the matching trace in the local trace subset is assigned to the computed trace, and the computed trace is then not sent to the server. In this manner, at least some of the media identification load can be offloaded from the server to one or more of the local clients.

It should be noted that the traces in the local trace subset can contain many more fingerprints per song than those in the full server database, since the number of currently popular media objects, such as songs, is relatively small compared to the entire population of media objects. This has the added advantage of further reducing the number of traces sent to the server, since as soon as a match is made, the currently playing media object can be checked locally against the local store of fingerprints for that media object as long as the media object plays. For example, if a fingerprint were computed every 5 seconds for a song, the client would not have to send any traces to the server as long as it finds the expected match every 5 seconds.

In a further embodiment, the client simply stops sending traces to the server as soon as a positive match is identified, for the duration of the remainder of the identified media object, such as song S. This duration information could be sent to the client from the server, along with other identification information, when a positive match is found. While this is a simple method to further alleviate the burden on the server/cache system, it may result in a false negative (that is, a media object that should have been identified, but that was not) if the user, for example, switches media streams before the end of the aforementioned identified song S. However, this can be prevented by simply keeping track of when the the client keeps switches streams, and then immediately start sending traces to the server again (after first checking against the local trace subset, if one exists), whenever a stream switch occurs.

3.1.6 Media Object Identification:

As noted above, identification of media objects is accomplished by matching a trace computed by a local client with a trace, or fingerprint, held by the server (except in the case of searching the local trace subset, as described above). Whenever the server identifies a match to a trace or a fingerprint having associated media object identification information, as described above, then that media object information is immediately sent back from the server to the particular client that sent the particular matching trace to the server.

Once the media object identification information has been received by the client, then the client can make whatever use of that information is desired. For example, in the simplest case, the client can simply display the media object information in real-time so as to inform the user of what media object is currently being played in the media stream. Other uses of the media object identification information is to construct local playlists which provide a local historical record of the media objects identified in any of the streams monitored by each individual client.

Figure 4:
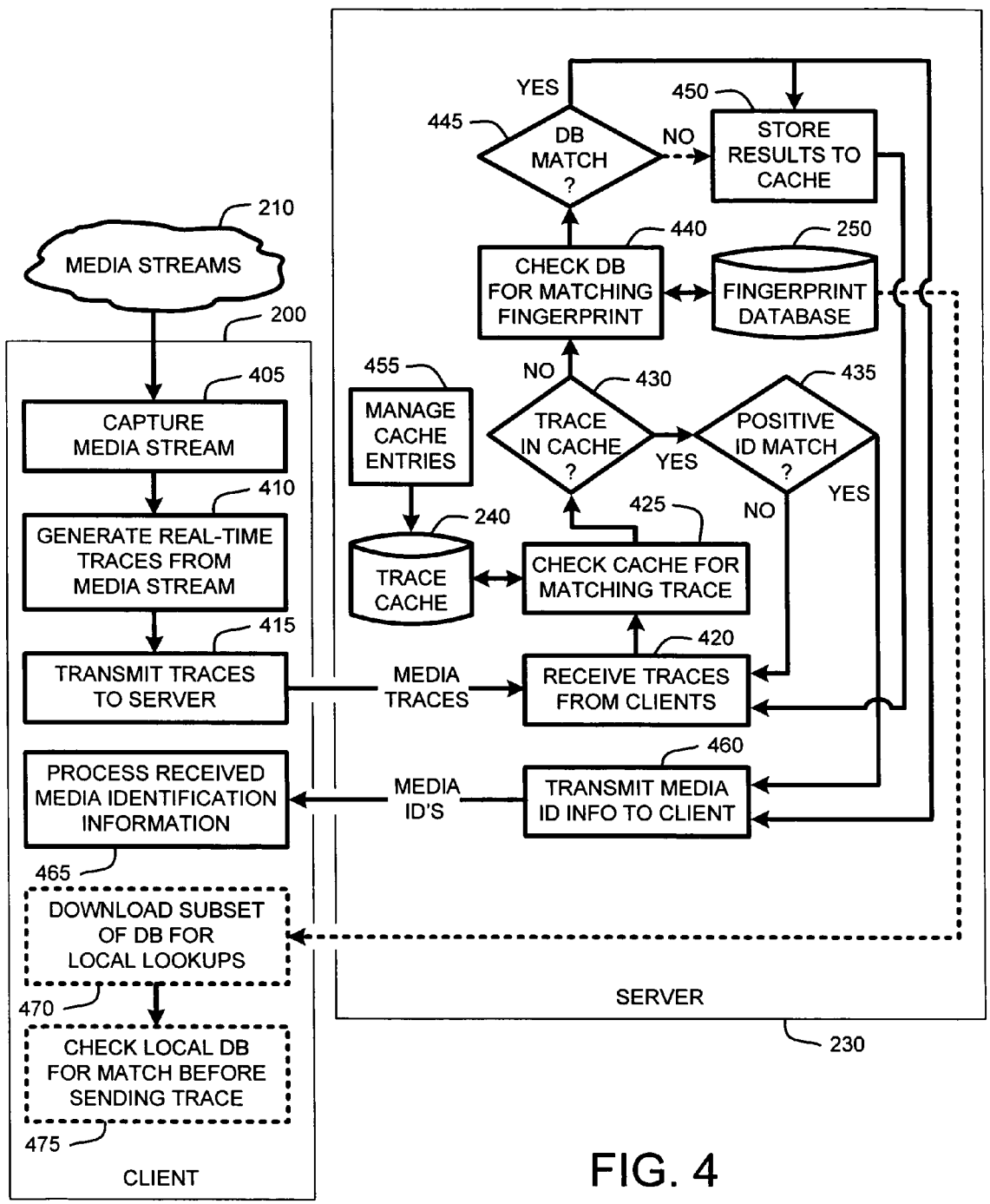
FIG. 4 provides an operational flow diagram which illustrates the general operation of one embodiment of the Media Identifier, as described herein.

3.2 Media Identifier Operation:

The processes described above with respect to FIG. 2 and FIG. 3 are illustrated by the general operational flow diagram of FIG. 4. In general, FIG. 4 illustrates an exemplary operational flow diagram showing several operational embodiments of the Media Identifier. It should be noted that any boxes and interconnections between boxes that are represented by broken or dashed lines in FIG. 4 represent alternate embodiments of the Media Identifier described herein, and that any or all of these alternate embodiments, as described below, may be used in combination with other alternate embodiments that are described throughout this document. Further, it should be noted that in the discussion below, the system is generally described with respect to a single client operating with a single server. However, in view of the preceding discussion, it should be clear that the Media Identifier described herein is fully capable of operating with an extremely large number of clients and any desired number of servers.

In particular, as illustrated by FIG. 4, operation of the Media Identifier begins by having the client 200 capture 405 a media stream 210. Capture of the media stream is accomplished using conventional methods, including, for example, simply tuning in to a radio or television broadcast, or subscribing to a streaming media broadcast or simulcast via a network such as the Internet. As the media stream 210 is captured 405, the client generates real-time traces 410 from samples of the media stream. These real-time media traces are then transmitted 415 to the server 230 using conventional network transmission protocols. Computation and transmission of the media traces continues for as long as the media stream is being received, and for as long as the client desires to have identification information for the media objects embedded in the media stream.

However, as noted above, in one embodiment, the client will temporarily suspend computation and transmission of traces to the server following receipt of media object identification information from the server. For example, as noted above, the fingerprints computed for the fingerprint database are computed from known positions within known media objects. Consequently, the remaining length or duration of those media objects will be known relative to the computed trace (less the delay time from sending the trace to the server and receiving the media object identification back from the server). Therefore, with this embodiment, so long as this duration information is provided along with the media object identification information, there will be no need for the client to either compute or send any additional traces to the server until after the expected endpoint of the currently playing media object. However, in the event that the client begins capturing a different media stream (such as by switching radio stations, for example) then trace computation and transmission will immediately resume. It should be clear that this embodiment can substantially reduce the server load by dramatically reducing the number of traces sent to the server following a successful media object identification returned to the client.

Once the server 230 receives 420 the transmitted traces from the clients 200, the server immediately checks 425 the trace cache 240 to determine 430 whether there is a matching trace in the cache. If there is a matching trace in the trace cache, then the matching trace in the cache is examined 435 to determine whether it is associated with a positive database hit. If the matching trace is associates with a positive database hit, then the media identification information associated with that matching trace is immediately transmitted 460 back to the client 200.

Conversely, in the case that the trace cache 240 does not contain a matching trace, the next step is to check 440 the fingerprint database 250 in an attempt to locate a matching fingerprint. If there is a database match 445, then the trace is stored 450 to the trace cache 240, and the media identification information associated with that matching trace is immediately transmitted 460 back to the client 200. In the case that there is no database match 445, then the trace is again stored 450 to the trace cache 240 as a negative hit.

In either case, once either a match 430 has been found in the trace cache 240, or not, or a match 445 located in the database, or not, and any associated media object identification information transmitted 460 to the client, then the server simply waits for the next trace to be sent from the client for comparison to the traces and/or fingerprints in the trace cache 240 and/or the fingerprint database 250, respectively. Further, as noted above, the trace cache 240 is managed 455 on an ongoing basis to remove trace entries whose lifetime has expired.

Once the client 200 receives any media object identification information, that information is processed 465 by the client and provided to the user as desired. For example, in one embodiment, the media object identification information is used to provide a current media object identity display to the user as the media stream is received and played back. Alternately, the media object identification information can be used for other purposes, including, but not limited to, playlist generation, media stream characterization, statistical analysis of the media stream, etc.

Finally, in another embodiment, a subset of the fingerprint database 250 (and/or the trace cache 240) is downloaded 470 by the client 200 from the server 230 to act as a local fingerprint database. As noted above, this subset can also contain additional fingerprints that the server itself does not use for lookup, in order to increase the coverage, as described above (for example, the client may check several fingerprints per song). In particular, for relatively more popular (or more frequently observed) media objects additional fingerprints are computed for each media object by the server and included in the subset of fingerprints downloaded to the clients to further reduce server calls. As described above, this local database is then searched 475 by the client prior to transmitting 415 any traces to the server 230. In the event that a trace match is located in this search of the local database, then the corresponding trace is not sent to the server 230 for processing as described above.

The foregoing description of the Media Identifier has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the Media Identifier. It is intended that the scope of the invention be limited not by this detailed description, but rather by the claims appended hereto.

What is claimed is:

1. A method for providing identification of media objects embedded in client-monitored media broadcast streams to each of a plurality of client computers, comprising using a computing device to:

for each of a plurality of client computers, transmit client-generated media stream traces to a server computer on an ongoing basis;

for each transmitted media stream trace received by the server, use the server to search a trace cache for a matching trace to the media stream trace;

wherein each trace in the trace cache includes a pre-determined lifetime, and wherein any trace having an expired lifetime is removed from the trace cache along with any associated media object identification information;

if the trace cache includes a matching trace, transmit any media object identification information associated with that matching trace from the server to the corresponding client;

if the trace cache does not include a matching trace, search a fingerprint database to determine whether there are any matching fingerprints to media stream trace and store the transmitted media stream trace to the trace cache along with results of the database search;

if the fingerprint database includes a matching fingerprint, transmit media object identification information associated with the fingerprint from the server to the corresponding client;

uploading a subset of one or more fingerprints from the fingerprint database and zero or more traces from the trace cache and any media object identification information associated with the uploaded fingerprints and traces from the server to one or more of the client computers; and wherein the fingerprints sent to the client, although stored in the server, are not used by the server itself for trace matching for the corresponding client.

2. The method of claim 1 wherein the client-generated media traces are periodically computed and transmitted by each client to the server.

3. The method of claim 1 wherein the pre-determined lifetime is longer for traces having associated media object identification information than for traces not having associated media object identification information.

4. The method of claim 1, wherein the time remaining in the pre-determined lifetime for a trace in the trace cache is reset to the pre-determined lifetime when the trace in the trace cache matches a media stream trace.

5. The method of claim 1 wherein traces in the trace cache which are frequently matched with media stream traces are persistently maintained in the trace cache regardless of the pre-determined lifetime.

6. The method of claim 1 wherein each trace in the trace cache is removed from the trace cache along with any associated media object identification information after failing to match any transmitted media stream traces for a predetermined period of time.

7. The method of claim 1 wherein the trace cache has a fixed size, and wherein an oldest trace in the trace cache is removed from the trace cache along with any associated media object identification information whenever a transmitted media stream trace is stored to the trace cache.

8. The method of claim 1 wherein the subset of fingerprints and traces on each client is searched for a match to each media stream trace generated by the corresponding client before transmitting the client-generated media stream traces to the server computer, and wherein the client-generated media stream traces are not sent to the server computer if those client-generated media stream traces match any entries of fingerprints and traces in the subset.

9. The method of claim 1 wherein the media object identification information transmitted to each corresponding client includes a remaining duration of a currently streaming media object embedded in a client-monitored media broadcast stream, and wherein any client receiving such information temporarily suspends transmitting client-generated media stream traces to the server for the remaining duration of the currently streaming media object.

10. The method of claim 9 wherein the transmission of client-generated media stream traces to the server is resumed as soon as the system detects that the user has switched to a different stream.

11. A system for providing identification of media objects embedded in media broadcast streams to each of a plurality of clients, comprising:

means for monitoring any one of a plurality of media stream broadcasts on each of a plurality of client computers;

means for generating real-time traces from samples of the monitored media stream broadcasts on each of the client computers;

means for transmitting each real-time trace from each client computer to a server bank of one or more server computers;

for each real-time trace received by the server bank, means for using the server bank to search a server-based trace cache for a match to the real-time trace, and transmitting any media object identification information associated with a matching trace from the trace cache to a corresponding one of the client computers;

wherein each trace in the trace cache includes a pre-determined lifetime, and wherein any trace having an expired lifetime is removed from the trace cache along with any associated media object identification information;

if the trace cache does not include a match to the real-time trace, means for using the server bank to search a server-based fingerprint database for a fingerprint match to the real-time trace, transmit any media object identification information associated with a matching fingerprint from the fingerprint database to the corresponding client computer, and store the real-time trace to the trace cache along with results of the database search;

uploading a subset of one or more fingerprints from the fingerprint database and zero or more traces from the trace cache and any media object identification information associated with the unloaded fingerprints and traces from the server to one or more of the client computers; and wherein the fingerprints sent to the client, although stored in the server, are not used by the server itself for trace matching for the corresponding client.

12. The system of claim 11 wherein the pre-determined lifetime is longer for traces having associated media object identification information than for traces not having associated media object identification information.

13. The system of claim 11 wherein the time remaining in the pre-determined lifetime for a trace in the trace cache is reset when the trace in the trace cache matches a media stream trace.

14. The system of claim 11 wherein traces in the trace cache which are frequently matched with media stream traces are persistently maintained in the trace cache regardless of the pre-determined lifetime.

15. The system of claim 11 wherein each trace in the trace cache is removed from the trace cache along with any associated media object identification information after failing to match any transmitted media stream traces for a predetermined period of time.

16. The system of claim 11 wherein the media object identification information transmitted to each corresponding client computer includes a remaining duration of a currently streaming media object embedded in the media broadcast stream monitored by each corresponding client computer, and wherein any client computer receiving such information temporarily suspends transmitting real-time traces to the server bank for the remaining duration of the currently streaming media object.

17. A computer storage medium having computer executable instructions stored thereon for providing media object identification to a plurality of client computers, said computer executable instructions causing a computer to perform steps comprising:

using a plurality of client computers to generate sequential real-time traces from samples of captured media streams being monitored by each client;

transmitting the generated traces to a server computer; and for each transmitted trace, using the server computer for:

searching a trace cache accessible by the server computer to determine whether the trace cache includes a matching trace, wherein each trace in the trace cache includes a pre-determined lifetime, and wherein any trace having an expired lifetime is removed from the trace cache along with any associated media object identification information, in the event that the trace cache includes a matching trace, determining whether the matching trace includes any associated media object identification information, and if so, transmitting that media object identification from the server to the corresponding client, in the event that the trace cache does not include a matching trace, searching a fingerprint database to determine whether there are any matching fingerprints and storing the transmitted trace to the trace cache along with results of the database search, and in the event that the fingerprint database includes a matching fingerprint, transmitting media object identification information associated with the fingerprint from the server to the corresponding client;

uploading a subset of one or more fingerprints from the fingerprint database and zero or more traces from the trace cache and any media object identification information associated with the unloaded fingerprints and traces from the server to one or more of the client computers; and wherein the fingerprints sent to the client, although stored in the server, are not used by the server itself for trace matching for the corresponding client.

18. The computer storage medium of claim 17 wherein the pre-determined lifetime for a trace in the trace cache is reset when the trace in the trace cache matches a media stream trace.

19. The computer storage medium of claim 17 wherein traces in the trace cache which are frequently matched with transmitted traces are persistently maintained in the trace cache regardless of the pre-determined lifetime.

20. The computer storage medium of claim 17 wherein each trace in the trace cache is removed from the trace cache along with any associated media object identification information after failing to match any transmitted traces for a predetermined period of time.

21. The computer storage medium of claim 17 wherein the trace cache has a fixed size, and wherein an oldest trace in the trace cache is removed from the trace cache along with any associated media object identification information whenever a transmitted trace is stored to the trace cache.

22. The computer storage medium of claim 17 wherein the media object identification information transmitted to each corresponding client includes a remaining duration of a currently streaming media object embedded in captured media stream monitored by each client, and wherein any client receiving such information temporarily suspends transmitting traces to the server computer for the remaining duration of the currently streaming media object.

* * * * *